United States Patent
Kuth et al.

[11] Patent Number: 5,726,685
[45] Date of Patent: Mar. 10, 1998

[54] INPUT UNIT FOR A COMPUTER

[75] Inventors: Rainer Kuth, Herzogenaurach; Wolfgang Pritzel, Prutting, both of Germany

[73] Assignee: Siemens Aktiengesellschaft, Munich, Germany

[21] Appl. No.: 497,387

[22] Filed: Jun. 30, 1995

[30] Foreign Application Priority Data

Jun. 30, 1994 [DE] Germany ............... 44 23 005.5

[51] Int. Cl.⁶ ........................................ G09G 5/00
[52] U.S. Cl. ..................... 345/173; 345/179; 345/156
[58] Field of Search ........................... 345/156, 157, 345/158, 166, 173, 175, 176, 179, 180; 250/227.13; 178/18, 19; 341/31, 33; 348/707

[56] References Cited

U.S. PATENT DOCUMENTS

| | | | |
|---|---|---|---|
| 3,825,730 | 7/1974 | Worthington, Jr. et al. | 250/569 |
| 3,885,096 | 5/1975 | Inuiya | 345/7 |
| 4,490,607 | 12/1984 | Pease et al. | 345/179 |
| 4,561,017 | 12/1985 | Greene | 348/707 |
| 4,812,833 | 3/1989 | Shimauchi | 341/33 |
| 4,883,926 | 11/1989 | Baldwin | 345/179 |
| 5,483,261 | 1/1996 | Yasutake | 345/158 |
| 5,491,495 | 2/1996 | Ward et al. | 345/173 |
| 5,530,456 | 6/1996 | Kokubo | 345/175 |

FOREIGN PATENT DOCUMENTS

| | | |
|---|---|---|
| 0 309 654 | 4/1989 | European Pat. Off. . |
| 0 484 160 | 5/1992 | European Pat. Off. . |
| 6069728 | 4/1985 | Japan ............... 345/173 |

*Primary Examiner*—Dennis-Doom Chow
*Attorney, Agent, or Firm*—Hill, Steadman & Simpson

[57] ABSTRACT

An input unit for a computer has a housing with a transparent plate at one side thereof over which an input element is movable. The housing contains a camera which identifies the position of the input element and converts this position into a position output signal. An evaluation unit converts the position output signal into control signals for the computer according to a mouse protocol. The input unit can thus be used to control the computer in a manner which mimics the control of a computer using a conventional mouse, but avoids the disadvantages associated with conventional mouse control. The input element may be an element specifically dedicated for that purpose, or may be a tool which the user happens to have available, or may simply be the finger of a user.

15 Claims, 4 Drawing Sheets

INPUT UNIT FOR A COMPUTER

BACKGROUND OF THE INVENTION

1. Field of the Invention

The present invention is directed to an input unit for a computer of the type wherein an element which is manipulated by a user is selectively moved to designate a desired input.

2. Description of the Prior Art

An input unit for a computer is disclosed, for example, by U.S. Pat. No. 3,885,096. With which a position can be marked on a picture screen with a light pen. The respective position of the light pen is acquired by a camera and is converted into position signals that serve for the control of a computer.

U.S. Pat. No. 3,825,730 discloses an input unit with which positions defined by a pen on a projection screen are predetermined for the control of a system. The projection screen is transparent and is illuminated at the side facing away from the user. For acquiring positions, the pen itself can either be actively illuminated or can reflect light incident thereon onto the projection screen, for example with a mirrored point.

European Application 0 484 160 discloses an input unit having a light pen that has three function keys. Various light pens that can be distinguished by frequency coding of the light signals can be utilized.

European Application 0 309 654 discloses an input system of a type wherein the position of a pen on a screen is acquired by means of a touch input such input units being referred to in general as "touch screens". Different functions, for example a write function and an erase function, can be triggered by changes in properties of the pen, for example the diameter or the reflectivity thereof.

In addition to a keyboard, a mouse is another standard input unit for computers. A conventional mouse has a rolling ball and an electrical connection between the mouse and the computer, however, and is thus not suitable for all applications. In order to permit operation using a mouse in a nuclear magnetic resonance tomography apparatus or in a biomagnetism system inside a measuring compartment, for example, the mouse system must be insensitive to strong magnetic stray fields and must be shielded against electromagnetic interactions with the measuring system. Given use during a surgical operation, further, the mouse must be capable of being sterilized.

In order to avoid the problem of electromagnetic interactions, a know fiber optical mouse that is connected to a computer via an optical fiber bundle can be employed. The manipulability, however, is restricted by this connection. Fiber optical trackballs are also known, having a mechanical rolling ball that the operator can rotate in arbitrary directions. Given such a trackball, however, liquids can penetrate into the unavoidable gap between the rolling ball and the surrounding housing.

There are also no satisfactory solutions for a mouse control in, for example, the following applications:

operation in highly contaminated environments operation in environments with an explosion hazard and/or in chemically aggressive environments sabotage-proof and wear-resistant operation at generally accessible computers.

It would also be desirable in certain instances if no special operating elements had to be made available, for example given a mouse control through a display window or, in general, given generally accessible computers at which one should prevent such operating elements from being taken away.

The aforementioned known input units do not represent a replacement for a mouse function but serve, stated in general terms, to select a specific function from a given menu displayed on a monitor or as character tools. An important function of the mouse control is also lacking, namely the function of the mouse keys.

SUMMARY OF THE INVENTION

It is an object of the present invention to provide an input unit with mouse function for a computer with which an operation is possible under extremely unfavorable conditions and in problematical environments.

The above object is achieved in accordance with the principles of the present invention in an input unit for a computer having a closed housing with an optically transparent plate on one side thereof on which an input element is movable, a camera contained in the housing which identifies the position of the input element on the transparent plate and which converts the identified position into a position output signal, and an evaluation unit which converts the position output signal into a signal or signals for controlling the computer according to a mouse protocol.

The input element may be an element specifically dedicated for that purpose, or may simply be an elongated tool which the user happens to have available, or may simply be the finger of a user. If the input element is specially dedicated for that purpose, it may be provided with one or more light emitters to provide the capability of performing functions comparable to those performed by mouse keys or push buttons.

DESCRIPTION OF THE PREFERRED EMBODIMENTS

Figure 1:
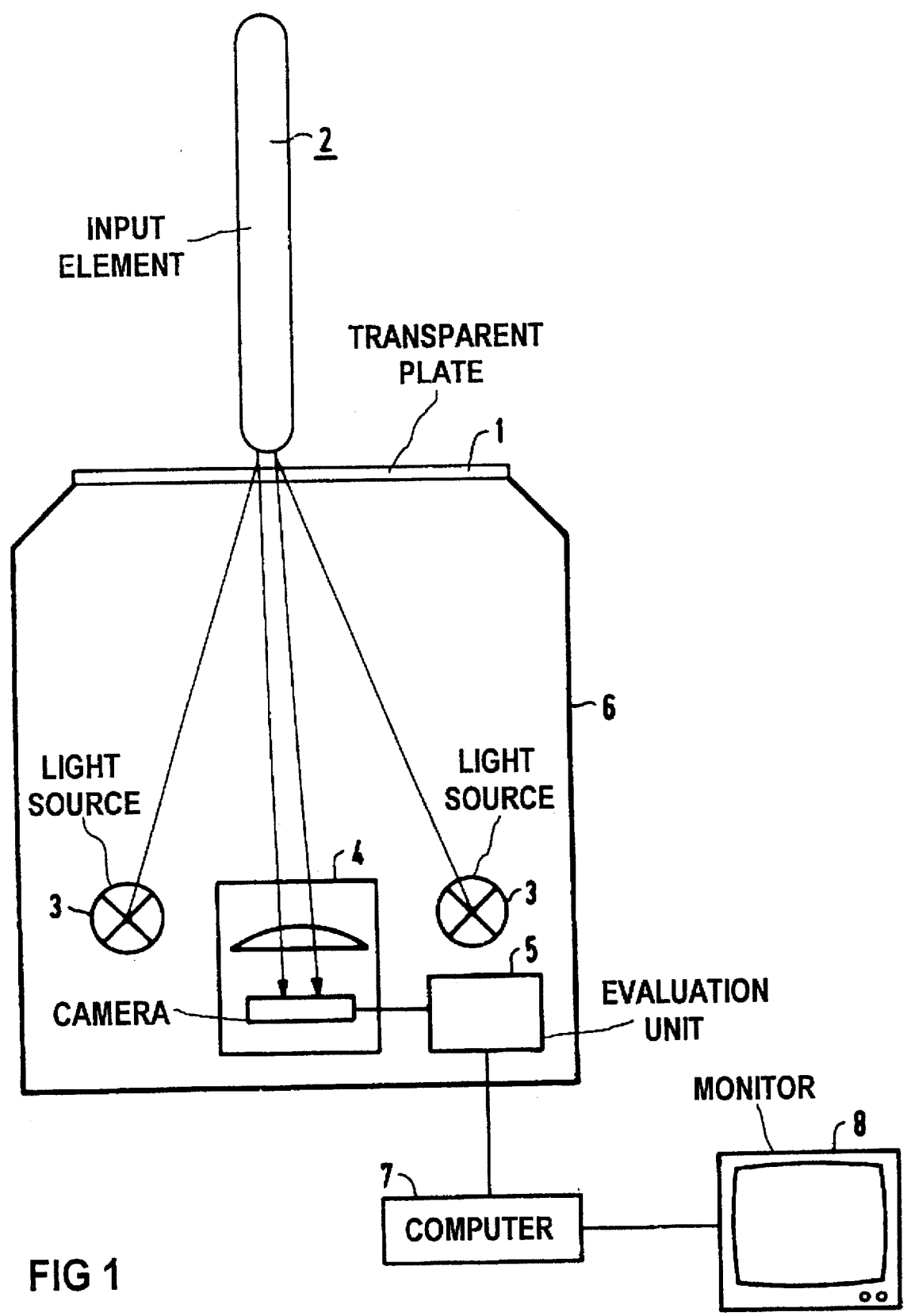
FIG. 1 is a first exemplary embodiment of an input unit constructed in accordance with the principles of the present invention.

FIG. 1 shows a first exemplary embodiment of the invention. A transparent glass plate 1, which is illuminated by a light source 3 at the side facing away from the user, lies on a side of a closed housing 6. Light that is reflected by a user-manipulable (movable) input element 2 disposed on that side of the glass plate 1 facing toward the user is detected with a camera 4. The camera 4 acquires the position of the input element 2.

The position signals are converted according to a standardized mouse protocol into input signals for the computer 7 with an evaluation unit 5. As in conventional mouse control, for example, a cursor can thus be controlled on a monitor 8.

The input element 2 is implemented as a pen in the exemplary embodiment of FIG. 1. Since, however, the only thing of concern is that light is reflected at a defined position from an object on the glass plate 1, a separate operating element need not necessarily be provided; rather, the control can ensue, for example, with a finger tip or with a tool that the user is already using, such as, for example, a ball pen or, given employment during the course of operations, a scalpel holder.

Conventional camera elements, for example CCD units (charge coupled devices) as are employed, for example, in video cameras, can be employed as the camera 4. The camera 4 is expediently set such that it only reacts to the input element 2 up to a defined distance from the glass plate 1. This is possible by setting the sharpness plane of the camera 4. The mouse function thus becomes active when the input element is in "optical contact" with the plate 1, which may occur at distances less than an upper range of 3 through 5 mm in front of the plate 1. Movement can be undertaken in arbitrary directions, as in the case of a conventional mouse. The given position is maintained after the input element is lifted away from the plate 1.

Figure 2:
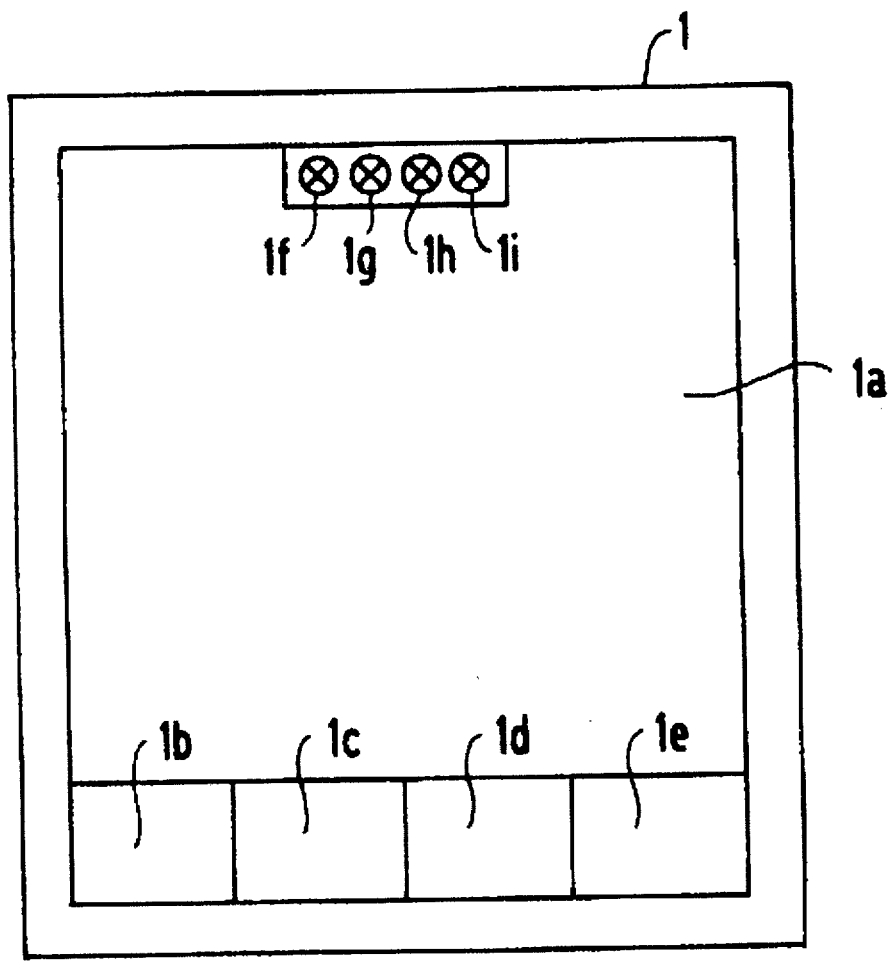
FIG. 2 shows an exemplary embodiment of a division of the transparent disk useable in all embodiments of the inventive input unit.

Expediently, the input unit is also capable of mimicking operation corresponding to the use of the keys of a mouse. To this end, for example, the glass plate 1 according to FIG. 2 can be divided into a larger area 1a and smaller areas 1b through 1e lying at the lower edge. The movement of the input element 2 is acquired within the area 1a and is converted into a cursor movement on the screen of the computer 7. When, however, one of the areas 1b and 1e is touched with the input element 2, this is interpreted as key actuation according to the aforementioned standard mouse protocol. For example, a left mouse key can be allocated to the surface 1c and a right mouse key can be allocated to the surface 1e. The surface 1b can be used as a permanent function for the left mouse key.

Figure 3:
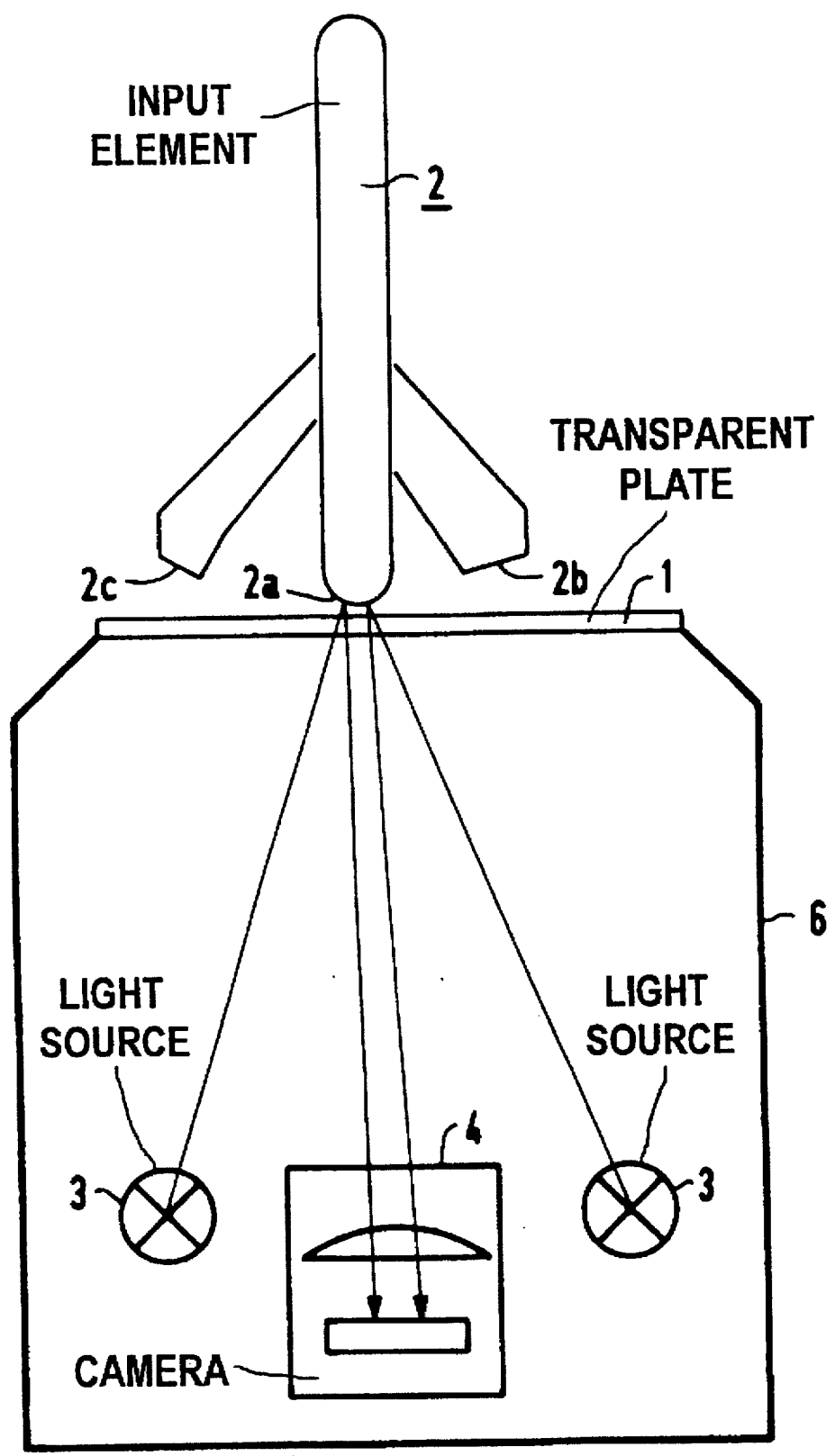
FIG. 3 is a schematic illustration of a second exemplary embodiment of an input unit constructed in accordance with the principles of the present invention having a pen with three contact surfaces.

Alternatively, a multi-fingered pen 2 can be provided as input element, as shown, for example, in FIG. 3. The pen 2 has three fingers 2a through 2c, whereby a positional determination as set forth above is implemented with the finger 2a. The fingers 2b and 2c can have different optical characteristics from the finger 2a and the camera 4 can include a recognition stage for identifying when finger 2c of the pen 2 is applied. When, for example, the finger 2c lies on the glass plate 1, the function that corresponds to the actuation of the left mouse key is thus triggered; when the finger 2b lies on the glass plate 1, a function that corresponds to an actuation of the right mouse key according to the mouse protocol is triggered.

Advantageously, luminous displays 1f through 1i can be provided which signal the logic state of the input unit. Thus, for example, the luminous display 1f can signal that no position signal is recognized at the moment, the luminous display 1g can signal that the attempted input is ambiguous, for example when more than one finger is applied on the plate 1, the luminous display 1h can signal that the signal quality is inadequate, for example because the input element 2 is too far away from the transparent pane 1, and the luminous display 1i can signal that the signals are satisfactory and/or accepted. To this end, the luminous signals advantageously have different colors.

Figure 4:
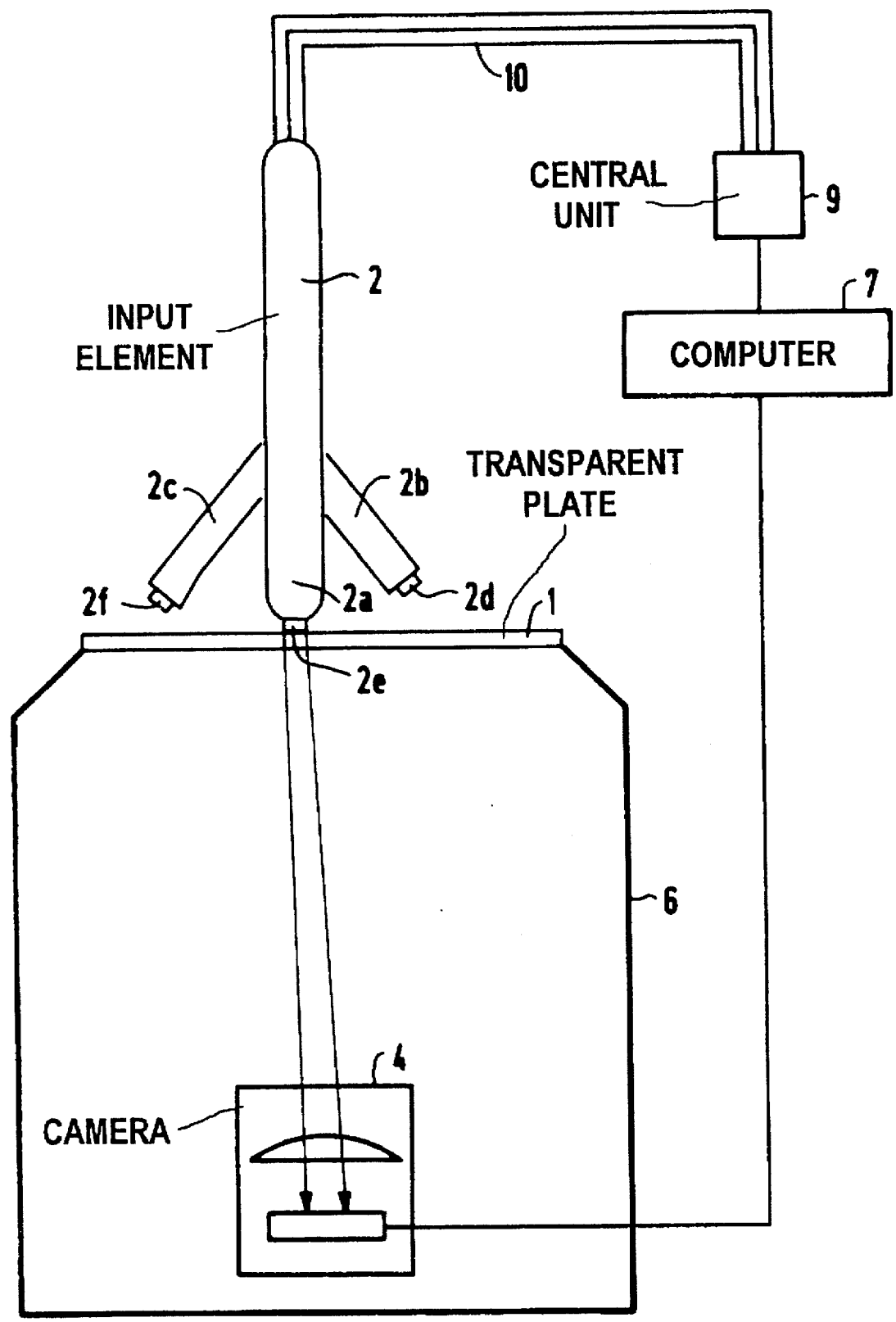
FIG. 4 is a schematic illustration of a third embodiment of an input unit constructed in accordance with the principles of the present invention.

In an alternative embodiment, as shown in FIG. 4, the input element 2 itself transmits light that is acquired by the camera 4. In the exemplary embodiment of FIG. 4, the light is generated in a central unit 9 and is conducted to a pen-shaped input element via light waveguides 10. Three light signals are provided in the exemplary embodiment; accordingly, the pen 2 has three fingers 2a through 2c, each having a respective light exit aperture 2d through 2f. The light exit aperture 2e is thereby allocated to a position signal, the light exit aperture 2f is allocated to the left mouse key function and the light exit aperture 2d is allocated to the right mouse key function. A determination can be made identifying from which finger the light incident onto the camera 4 was emitted when the central unit 9 contains three light sources that are cyclically driven in a pulsed manner. A determination can then be made on the basis of the chronological position of the signal received by the camera 4 within a cycle as to whether the light signal is allocated to a position acquisition or to a special function (left/right mouse key).

The disclosed input unit is suitable for versatile employment under even the most unfavorable conditions, for example in highly contaminated environments in a clinical setting where high sterility demands are made. Due to the close relationship thereof to the commonly used mouse, the user requires practically no training time. It is especially advantageous for many applications when no separate input element is required, i.e. the input can also ensue with, for example, a finger. This is also of interest for applications where separate input elements would be jeopardized by willful destruction or removal.

Although modifications and changes may be suggested by those skilled in the art, it is the intention of the inventors to embody within the patent warranted hereon all changes and modifications as reasonably and properly come within the scope of their contribution to the art.

We claim as our invention:

1. An input arrangement for a computer, comprising:

a non-imaging transparent pane having opposed first and second sides;

a stylus movable over said first side of said pane and having a position-indicating surface and at least one function-actuating surface optically distinguishable from said position-indicating surface, said position-indicating surface being mounted on said stylus so as to be visible through said pane when said stylus is on said first side and said function-actuating surface being mounted on said stylus so as to be selectively movable, upon movement of said stylus, to a position so as to be visible through said pane;

camera means disposed at said second side of said pane identifying a position of said position-indicating surface and for generating a position-indicating signal corresponding thereto and for identifying when said function-actuating surface is visible through said pane and for generating a function-actuating signal when said function-actuating surface is visible through said pane; and evaluation means supplied with said position-indicating signal for generating a control signal for said computer dependent on said position-indicating signal and supplied with said function-actuating signal for generating a further control signal for actuating a selected function of said computer.

2. An input arrangement as claimed in claim 1 further comprising means for illuminating said transparent pane from said second side.

3. An input arrangement as claimed in claim 1 wherein said stylus has an end adapted for facing said first side of said transparent pane, and means for illuminating said end of said stylus.

4. An input arrangement as claimed in claim 1 wherein said evaluation means comprises means for evaluating said position output signal and said function-actuating signal using a mouse protocol.

5. An input arrangement as claimed in claim 1 wherein said pane has a plurality of regions respectively having computer functions associated therewith for said computer, and wherein said evaluation means comprises means for generating a signal triggering the computer function associated with a region when said stylus is identified as being in said region.

6. An input arrangement for a computer, comprising:

a non-imaging transparent pane having opposed first and second sides;

an input element movable on said first side of said pane, said input element having a first light emitter and at least one second light emitter;

means for temporarily illuminating said first light emitter and said at least one second light emitter at respectively different times, said first light emitter being mounted on said input element so that light therefrom is visible through said pane when said input element is on said first side and said at least one second light emitter being mounted on said input element so as to be selectively movable, upon movement of said input element so that light emitted from said at least one second light emitter is visible through said pane;

camera means disposed at said second side of said pane for receiving light from said first light emitter and for generating a first signal therefrom and for receiving light from said at least one second light emitter and for generating a second signal therefrom; and evaluation means, supplied with said first and second signals, for generating a control signal said a computer from said first signal identifying a position of said input element on said screen and for generating a further control signal for said computer from said second signal for actuating a selected function in said computer, said evaluation means respectively generating said control signal and said further control signal dependent on respective times at which said first and second signals are supplied to said evaluation means.

7. An input arrangement as claimed in claim 6 wherein said means for temporarily illuminating said first light emitter and said at least one second light emitter comprises a light source disposed remote from said input element and connected to said light emitters of said input element via respective light waveguides.

8. An input arrangement as claimed in claim 6 wherein said input element comprises a stylus.

9. An input arrangement as claimed in claim 6 further comprising a plurality of optical display elements which respectively identify a reception status of said position-indicating surface and said function-actuating surface by said camera means.

10. An input arrangement as claimed in claim 6 wherein said evaluation means comprises means for evaluating said first and second signals using a mouse protocol.

11. An input arrangement as claimed in claim 6 wherein said pane has a plurality of regions respectively having computer functions associated therewith, and wherein said evaluation means comprises means for generating a signal triggering the computer function associated with a region when said input element is identified as being in said region.

12. An input arrangement as claimed in claim 6 further comprising a plurality of optical display elements which respectively identify a reception status of light from said first light emitter and light from said at least one second light emitter by said camera means.

13. An input arrangement for a computer, comprising:

a non-imaging transparent pane having opposed first and second sides and a plurality of non-overlapping regions, each region having a mouse key function associated therewith;

an input element movable on said first side of said pane;

camera means, disposed at said second side of said pane, for identifying a position of said input element on said first side of said pane and for generating a position output signal corresponding to the position of said input element; and evaluation means, supplied with said position output signal, for converting said position output signal for said computer into a computer control signal dependent on the position of said input element and for actuating selected functions of said computer dependent on a region of said pane in which said input element is disposed.

14. An input arrangement as claimed in claim 13 wherein said plurality of regions of said pane comprise a first region having a right mouse key function associated therewith, a second region having a middle mouse key function associated therewith, a third region having a left mouse key function associated therewith, and a fourth region having a left mouse key continuous function associated therewith.

15. An input arrangement as claimed in claim 13 further comprising a plurality of optical display elements which respectively identify when said input element is positioned on said plurality of regions.

* * * * *